US010497944B2

(12) United States Patent
Tomoshige et al.

(10) Patent No.: US 10,497,944 B2
(45) Date of Patent: Dec. 3, 2019

(54) FUEL CELL UNIT

(71) Applicants: Murata Manufacturing Co., Ltd., Nagaokakyo-shi, Kyoto-fu (JP); TOKYO GAS CO., LTD., Tokyo (JP)

(72) Inventors: Yosuke Tomoshige, Nagaokakyo (JP); Tomoaki Hirai, Nagaokakyo (JP); Yasuhiro Sayo, Nagaokakyo (JP); Takuya Ito, Tokyo (JP); Takuto Kushi, Tokyo (JP); Toru Hatae, Tokyo (JP)

(73) Assignees: MURATA MANUFACTURING CO., LTD., Nagaokakyo-Shi, Kyoto-Fu (JP); TOKYO GAS CO., LTD., Tokyo (JP)

( * ) Notice: Subject to any disclaimer, the term of this patent is extended or adjusted under 35 U.S.C. 154(b) by 203 days.

(21) Appl. No.: 15/441,522

(22) Filed: Feb. 24, 2017

(65) Prior Publication Data

US 2017/0162879 A1 Jun. 8, 2017

Related U.S. Application Data

(63) Continuation of application No. PCT/JP2015/072343, filed on Aug. 6, 2015.

(30) Foreign Application Priority Data

Aug. 27, 2014 (JP) .................................. 2014-172905

(51) Int. Cl.
*H01M 8/0256* (2016.01)
*H01M 8/0247* (2016.01)
(Continued)

(52) U.S. Cl.
CPC ......... *H01M 8/0228* (2013.01); *H01M 8/021* (2013.01); *H01M 8/0258* (2013.01);
(Continued)

(58) Field of Classification Search
None
See application file for complete search history.

(56) References Cited

U.S. PATENT DOCUMENTS

2004/0110055 A1* 6/2004 Baba .................... H01M 8/0208
429/495
2005/0008915 A1 1/2005 Kwon
(Continued)

FOREIGN PATENT DOCUMENTS

JP H 06/349511 * 12/1994 .............. H01M 8/02
JP H10208760 A 8/1998
(Continued)

OTHER PUBLICATIONS

English translation of JPH 06/349511 (Year: 1994).*
(Continued)

*Primary Examiner* — Yoshitoshi Takeuchi
(74) *Attorney, Agent, or Firm* — Arent Fox LLP

(57) ABSTRACT

A solid oxide fuel cell stack has a surface from which via conductors for drawing a current are exposed. Collector plates are disposed on the surfaces of the fuel cell stack so that one main surface of the collector plates faces the via conductors. Fixing plates are fixed to the collector plates. Spacers are disposed between the fuel cell stack and the fixing plates. An adhesive fixes the fixing plates to the fuel cell stack through the spacers.

15 Claims, 6 Drawing Sheets

(51) Int. Cl.
*H01M 8/1246* (2016.01)
*H01M 8/1253* (2016.01)
*H01M 8/126* (2016.01)
*H01M 8/2425* (2016.01)
*H01M 8/2428* (2016.01)
*H01M 8/243* (2016.01)
*H01M 8/2432* (2016.01)
*H01M 8/2435* (2016.01)
*H01M 8/0258* (2016.01)
*H01M 8/0228* (2016.01)
*H01M 8/021* (2016.01)
*H01M 8/124* (2016.01)

(52) U.S. Cl.
CPC ....... *H01M 8/1246* (2013.01); *H01M 8/2425* (2013.01); *H01M 2008/1293* (2013.01); *Y02E 60/525* (2013.01); *Y02P 70/56* (2015.11)

(56) References Cited

U.S. PATENT DOCUMENTS

| | | | |
|---|---|---|---|
| 2005/0019636 A1 | 1/2005 | Kwon et al. | |
| 2005/0061151 A1* | 3/2005 | Rodrigo | B22F 3/00 96/15 |
| 2011/0171554 A1 | 7/2011 | Hayashi et al. | |
| 2012/0219875 A1 | 8/2012 | Hasegawa et al. | |
| 2014/0017587 A1* | 1/2014 | Ueda | H01M 8/12 429/465 |
| 2014/0134513 A1* | 5/2014 | Nakamura | H01M 8/0258 429/452 |
| 2016/0372778 A1 | 12/2016 | Hotta et al. | |

FOREIGN PATENT DOCUMENTS

| | | | | |
|---|---|---|---|---|
| JP | 2007500932 A1 | | 1/2007 | |
| JP | 2007502012 A | | 2/2007 | |
| JP | 2007273429 A | | 10/2007 | |
| JP | 2012089387 A | | 5/2012 | |
| JP | 2014049322 A | | 3/2014 | |
| WO | WO 2010038869 A1 | | 4/2010 | |
| WO | WO 2011059087 A1 | | 6/2011 | |
| WO | WO 2012/128307 | * | 9/2012 | ............. H01M 8/24 |
| WO | WO 2013/012009 | * | 1/2013 | ............. H01M 8/24 |
| WO | WO 2014208739 A1 | | 12/2014 | |

OTHER PUBLICATIONS

International Search Report issued for PCT/JP2015/072343 dated Oct. 13, 2015.
Written Opinion of the International Searching Authority issued for PCT/JP2015/072343 dated Oct. 13, 2015.

* cited by examiner ism, and a bind mechanism, are separately provided and a load is applied so as to bring the current collection mechanism into close contact with the fuel cell stack.

FUEL CELL UNIT

CROSS REFERENCE TO RELATED APPLICATIONS

The present application is a continuation of International application No. PCT/JP2015/072343, filed Aug. 6, 2015, which claims priority to Japanese Patent Application No. 2014-172905, filed Aug. 27, 2014, the entire contents of each of which are incorporated herein by reference.

FIELD OF THE INVENTION

This invention relates to a fuel cell unit, and in particular, to a fuel cell unit including a solid oxide fuel cell stack with a conductor for drawing current generated based on a fuel electrode gas and an air electrode gas extended onto the surface thereof.

BACKGROUND OF THE INVENTION

A fuel cell unit of this type has a current collection mechanism for drawing a current from an end of a fuel cell stack to the outside of the fuel cell unit. As the current collection mechanism, a plate-shaped or spring-shaped metal, alloy, or a conductive ceramic is usually used.

In this case, however, since the surface of the fuel cell stack and the surface of the current collection mechanism have small irregularities or a warpage, a conductive material, such as a metal, an alloy, or a conductive ceramic, needs to be separately provided to fill a small gap formed between the fuel cell stack and the current collection mechanism.

This causes the current collection mechanism and the conductive material to be exposed to a high-temperature oxidizing atmosphere, and thus the current collection mechanism and the conductive material are required to have not only a heat resistance, but also a resistance to the oxidizing atmosphere. Likewise, the current collection mechanism and the conductive material may also be exposed to a high-temperature reducing atmosphere. In this case, the current collection mechanism and the conductive material are required to have a resistance to the reducing atmosphere, instead of having a resistance to the oxidizing atmosphere.

Generally, there is a difference between the thermal expansion coefficients of the current collection mechanism, the conductive material, and separators constituting the fuel cell stack, which often causes a problem of destruction of conductive paths due to a thermal stress. Accordingly, in many cases, a system is employed in which various load mechanisms such as a spring mechanism, a screwing mechanism, and a bind mechanism, are separately provided and a load is applied so as to bring the current collection mechanism into close contact with the fuel cell stack.

PTL 1: International Publication No. WO 2010/038869

SUMMARY OF THE INVENTION

However, the requirement to provide the load mechanism in addition to the fuel cell stack causes problems such as an increase in the size of the fuel cell unit, complications of setting, and an increase in cost.

Therefore, a main object of the invention is to provide a fuel cell unit capable of enhancing the reliability of an electrical connection between a fuel cell stack and a collector plate without providing any load mechanism.

A fuel cell unit of this invention includes a solid oxide fuel cell stack that has a plurality of stacked fuel cells each including a solid electrolyte layer, a fuel electrode layer and an air electrode layer stacked with the solid electrolyte layer interposed therebetween, a separator stacked on each of the fuel electrode layer and the air electrode layer, and the fuel cells defining a fuel electrode gas flow channel in fluid communication with the fuel electrode layer and an air electrode gas flow channel in fluid communication with the air electrode layer, and conductors extended onto end faces of the fuel cells in a stacking direction. A collector plate is electrically connected to the conductors; a fixing plate is disposed on the collector plate to fix the collector plate; a spacer is disposed between the fuel cell stack and the fixing plate; and an adhesive fixes the fixing plate to the fuel cell stack through the spacer by softening the adhesive by heating.

Preferably, the adhesive is disposed between the surface of the fuel cell stack and the spacer and between spacer and the fixing plate.

The spacer can also be integrally formed with one of the fixing plate and the fuel cell stack.

Preferably, each of the fixing plate and the spacer has a thermal expansion coefficient equal to a thermal expansion coefficient of the separator.

Preferably, the fuel cell unit further includes a conductive material disposed between the surface of the fuel cell stack and the collector plate.

More preferably, the conductive material has a structure that is deformable depending on a thermal stress generated on the fuel cell stack and the collector plate.

Preferably, a difference between a thermal expansion coefficient of the collector plate and a thermal expansion coefficient of each of the separator, the fixing plate, and the spacer is 2 ppm/° C. or less.

In view of the above, since the fixing plate is fixed to the fuel cell stack through the spacer with the adhesive that is softened by heating, when there is a thermal expansion of the fuel cell stack, the fixing plate, and the collector plate, a force that causes the fuel cell stack and the fixing plate to sandwich the collector plate makes it possible to enhance the reliability of an electrical connection between the fuel cell stack and the collector plate without the need for providing any load mechanism.

The above-mentioned object, other objects, features, and advantages of this invention will become apparent from the detailed description of the following embodiments with reference to the drawings.

DETAILED DESCRIPTION OF THE PREFERRED EMBODIMENTS

Figure 1:
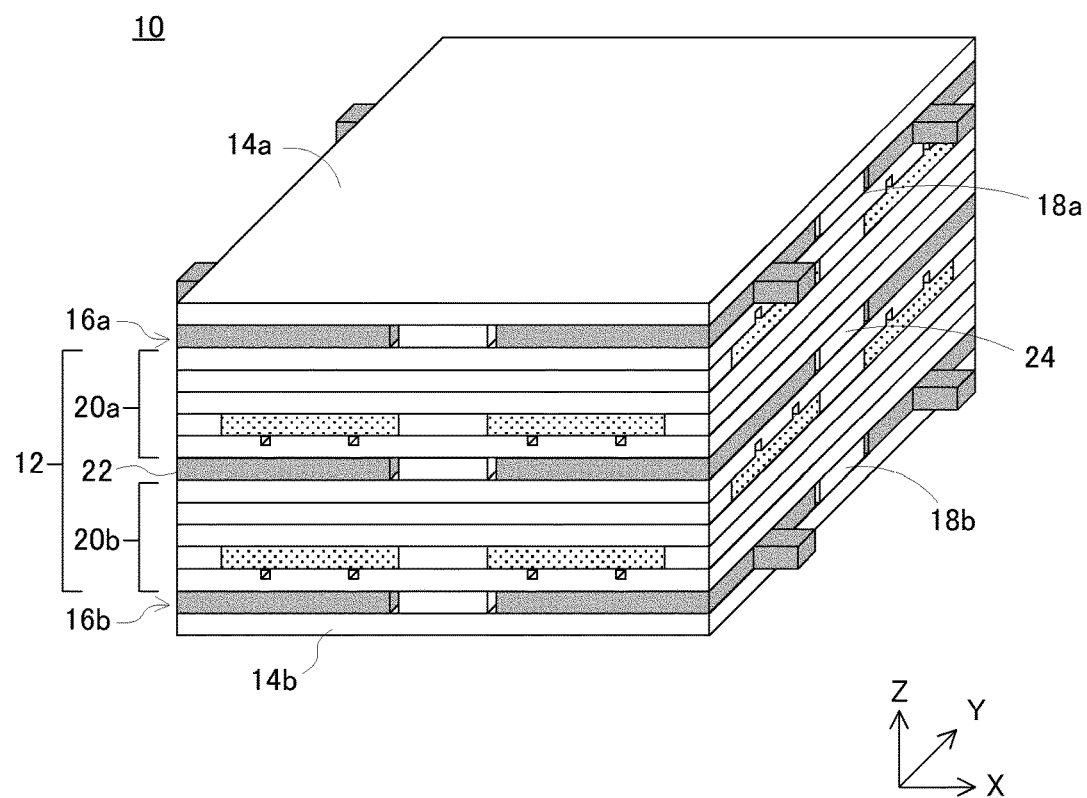
FIG. 1 is a perspective view showing an appearance of a fuel cell unit according to this embodiment.
Figure 2:
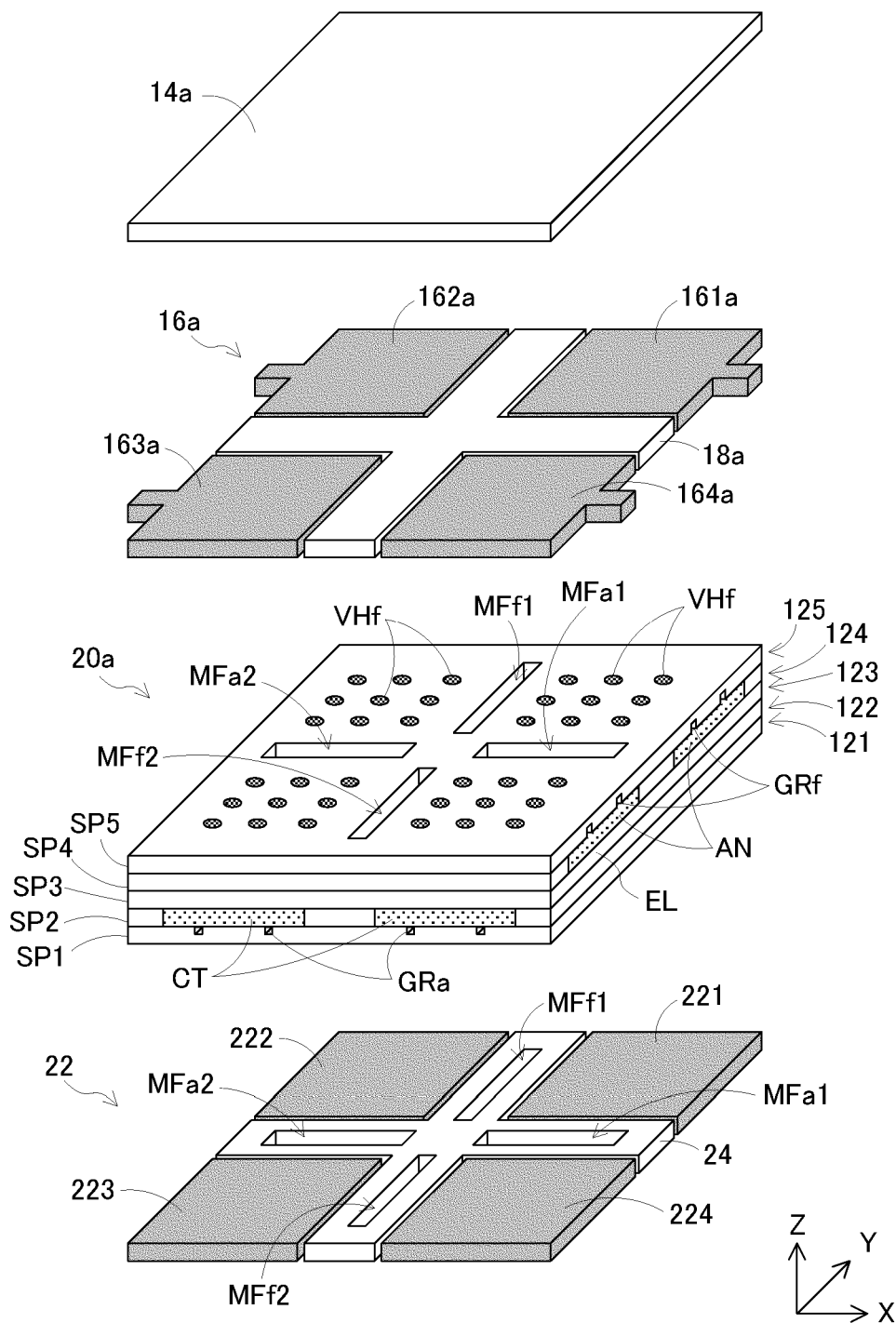
FIG. 2 is an exploded perspective view showing a part of the fuel cell unit.
Figure 3:
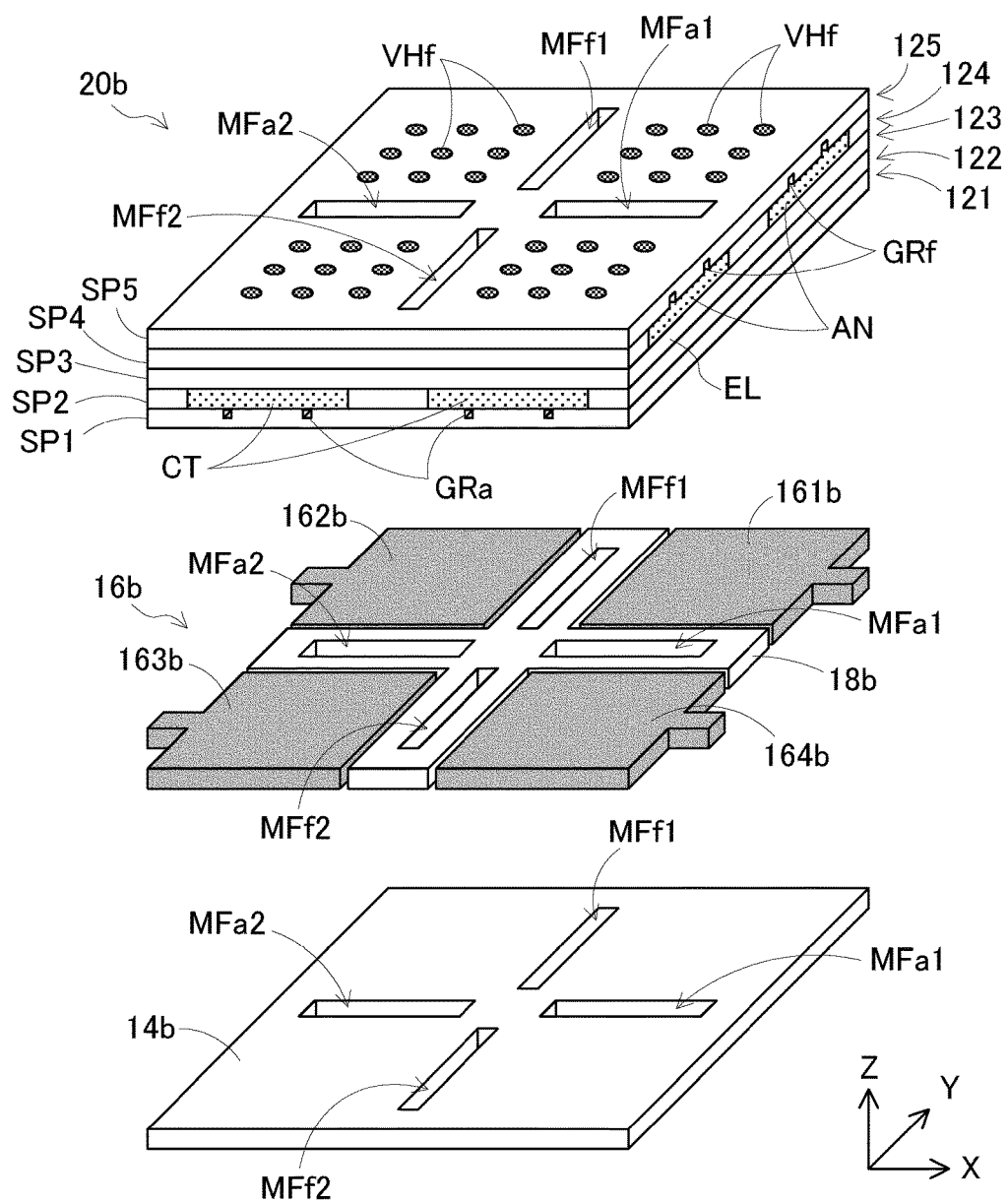
FIG. 3 is an exploded perspective view showing another part of the fuel cell unit.
Figure 4:
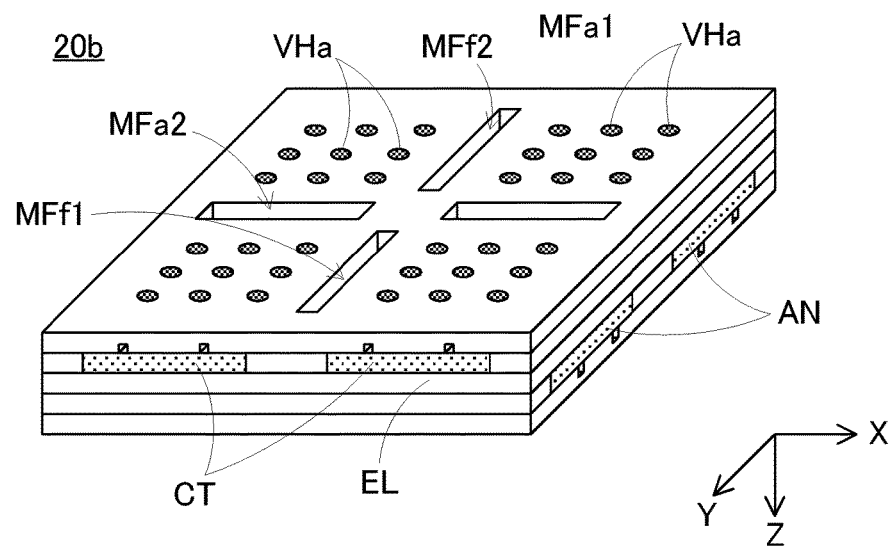
FIG. 4 is a perspective view showing a side surface and a lower surface of a fuel cell.

Referring to FIGS. 1 to 4, a fuel cell unit 10 according to this embodiment is a solid oxide fuel cell unit and includes a fuel cell stack 12 having a flat plate shape. At an upper surface (surface) of the fuel cell stack 12, via conductors VHf, VHf, . . . which are electrically connected to fuel electrodes AN are exposed. At a lower surface (surface) of the fuel cell stack 12, via conductors VHa, VHa, . . . which are electrically connected to air electrodes CT are exposed. A current generated based on a fuel electrode gas and an air electrode gas is drawn to the outside of the fuel cell unit by the via conductors VHf, VHf, . . . which are provided close to the fuel electrodes AN and the via conductors VHa, VHa, . . . which are provided close to the air electrodes CT.

Note that in this embodiment, an X-axis, a Y-axis, and a Z-axis are respectively assigned to a width direction, a depth direction, and a height direction of a rectangular parallelepiped forming the fuel cell stack 12.

The fuel cell stack 12 is also provided with two manifolds (fuel electrode gas flow channels) MFf1 and MFf2 for fuel electrode gas and two manifolds (air electrode gas flow channels) MFa1 and MFa2 for air electrode gas. Each of the manifolds MFf1, MFf2, MFa1, and MFa2 penetrates through the fuel cell stack 12 along the Z-axis and is opened to the upper surface and the lower surface of the fuel cell stack 12.

As viewed along the z-axis direction, the manifolds MFf1 and MFf2 are formed into a band-like shape on a straight line extending in the Y-axis direction from the center of the upper surface of the fuel cell stack 12, and the manifolds MFa1 and MFa2 are formed into a band-like shape on a straight line extending in the X-axis direction from the center of the upper surface of the fuel cell stack 12. More specifically, the manifold MFf1 is located on a positive side in the Y-axis direction relative to the center of the upper surface, and the manifold MFf2 is located on a negative side in the Y-axis direction relative to the center of the upper surface. The manifold MFa1 is located on the positive side in the X-axis direction relative to the center of the upper surface, and the manifold MFa2 is located on the negative side in the X-axis direction relative to the center of the upper surface.

Accordingly, the via conductors VHf, VHf, . . . which are provided close to the fuel electrodes AN are divided into four parts based on the manifolds MFf1, MFf2, MFa1, and MFa2. Similarly, the via conductors VHa, VHa, . . . which are provided close to the air electrodes CT are divided into four parts based on the manifolds MFf1, MFf2, MFa1, and MFa2.

A collector plate 16a is formed of four small collector plates 161a to 164a. The area of the main surface (the upper surface or the lower surface) of each of small collector plates 161a to 164a is slightly smaller than one-quarter of the area of the main surface (the upper surface or the lower surface) of the fuel cell stack 12, except for protrusions. A collector plate 16b is formed of four small collector plates 161b to 164b. The area of the main surface (the upper surface or the lower surface) of each of the small collector plates 161b to 164b is slightly smaller than one-quarter of the area of the main surface of the fuel cell stack 12, except for protrusions.

The collector plates 16a and 16b may be provided with a through-hole having a cross shape at the center of the main surface of each of the collector plates. In this case, each of the collector plates 16a and 16b has a single plate-shaped body.

The small collector plate 161a is disposed at a position on the positive side in the X-axis direction and on the positive side in the Y-axis direction on the upper surface of the fuel cell stack 12 in such a way that the lower surface (one main surface) of the small collector plate 161a faces some of the via conductors VHf, VHf, . . . . The small collector plate 162a is disposed at a position on the negative side in the X-axis direction and on the positive side in the Y-axis direction on the upper surface of the fuel cell stack 12 in such a way that the lower surface (one main surface) of the small collector plate 162a faces some of the other via conductors VHf, VHf, . . . .

The small collector plate 163a is disposed at a position on the negative side in the X-axis direction and on the negative side in the Y-axis direction on the upper surface of the fuel cell stack 12 in such a way that the lower surface (one main surface) of the small collector plate 163a faces some of the other via conductors VHf, VHf, . . . . The small collector plate 164a is disposed at a position on the positive side in the X-axis direction and on the negative side in the Y-axis direction on the upper surface of the fuel cell stack 12 in such a way that the lower surface (one main surface) of the small collector plate 164a faces some of the other via conductors VHf, VHf, . . . .

The small collector plate 161b is disposed at a position on the positive side in the X-axis direction and on the positive side in the Y-axis direction on the lower surface of the fuel cell stack 12 in such a way that the upper surface (one main surface) of small collector plate 161b faces some of the via conductors VHa, VHa, . . . . The small collector plate 162b is disposed at a position on the negative side in the X-axis direction and on the positive side in the Y-axis direction on the lower surface of the fuel cell stack 12 in such a way that the upper surface (one main surface) of the small collector plate 162b faces some of the other via conductors VHa, VHa, . . . .

The small collector plate 163b is disposed at a position on the negative side in the X-axis direction and on the negative side in the Y-axis direction on the lower surface of the fuel cell stack 12 in such a way that the upper surface (one main surface) of the small collector plate 163b faces some of the other via conductors VHa, VHa, . . . . The small collector plate 164b is disposed at a position on the positive side in the X-axis direction and on the negative side in the Y-axis direction on the lower surface of the fuel cell stack 12 in such a way that the upper surface (one main surface) of the small collector plate 164b faces some of the other via conductors VHa, VHa, . . . .

With this structure, the small collector plates 161a to 164a, i.e., the collector plate 16a is electrically connected to the via conductors VHf, VHf, . . . , and the small collector plates 161b to 164b, i.e., the collector plate 16b is electrically connected to the via conductors VHa, VHa, . . . .

The main surface (the upper surface or the lower surface) of a fixing plate 14a has an area that is substantially the same as the area of the upper surface of the fuel cell stack 12, and the main surface (the upper surface or the lower surface) of a fixing plate 14b has an area that is substantially the same as the area of the lower surface of the fuel cell stack 12.

The fixing plate 14a is disposed on the upper surface of the collector plate 16a in such a way that a part of the lower surface (one main surface) of the fixing plate 14a faces the upper surface (the other main surface) of the collector plate 16a. The fixing plate 14b is disposed on the lower surface of the collector plate 16b in such a way that a part of the upper surface (one main surface) of the fixing plate 14b faces the lower surface (the other main surface) of the collector plate 16b. In this case, the side surfaces of the fixing plates 14a and 14b are flush with the side surfaces of the fuel cell stack 12 (however, the side surfaces need not be necessarily flush with each other). The fixing plate 14b is provided with four through-holes that constitute the manifolds MFf1, MFf2, MFa1, and MFa2, respectively. The collector plates 16a and 16b are fixed by the fixing plates 14a and 14b that are disposed as described above.

A spacer 18a is disposed between the fuel cell stack 12 and the fixing plate 14a at a position (a position corresponding to another part of the lower surface of the fixing plate 14a) where the collector plate 16a is not formed, so as to adjust the distance from the upper surface of the fuel cell stack 12 to the lower surface of the fixing plate 14a to the distance equal to the thickness of the collector plate 16a. A spacer 18b is disposed between the fuel cell stack 12 and the fixing plate 14b at a position (a position corresponding to another part of the upper surface of the fixing plate 14b) where the collector plate 16b is not formed, so as to adjust the distance from the lower surface of the fuel cell stack 12 to the upper surface of the fixing plate 14b to the distance equal to the thickness of the collector plate 16b.

At this time, the lower surface (a first opposed surface) of the spacer 18a faces the upper surface of the fuel cell stack 12, and the upper surface (a second opposed surface) of the spacer 18a faces the lower surface of the fixing plate 14a. Similarly, the upper surface (a first opposed surface) of the spacer 18b faces the lower surface of the fuel cell stack 12, and the lower surface (a second opposed surface) of the spacer 18b faces the upper surface of the fixing plate 14b.

Further, since the collector plates 16a and 16b are disposed as described above, the main surface (the upper surface or the lower surface) of each of the spacers 18a and 18b has a cross shape. The spacer 18b is provided with four through-holes that constitute the manifolds MFf1, MFf2, MFa1, and MFa2, respectively.

Figure 5:
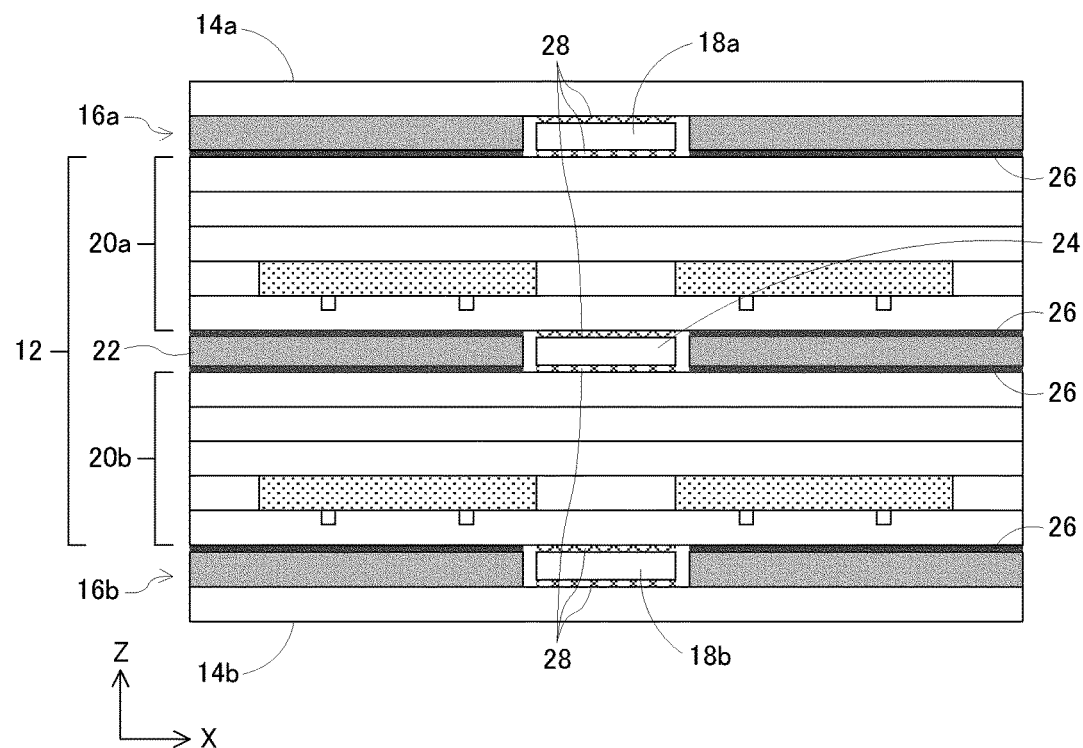
FIG. 5 is an enlarged side view showing a side surface of the fuel cell unit shown in FIG. 1.

As is seen from FIG. 5, a conductive material 26 is disposed between the upper surface of the fuel cell stack 12 and the lower surface of the collector plate 16a. The conductive material 26 is also disposed between the lower surface of the fuel cell stack 12 and the upper surface of the collector plate 16b. A small gap formed between the fuel cell stack 12 and each of the collector plate 16a and 16b is filled with the conductive material 26.

An adhesive 28 is disposed between the upper surface of the fuel cell stack 12 and the lower surface of the spacer 18a and between the lower surface of the fixing plate 14a and the upper surface of the spacer 18a. The adhesive 28 is also disposed between the lower surface of the fuel cell stack 12 and the upper surface of the spacer 18b and between the upper surface of the fixing plate 14b and the lower surface of the spacer 18b. As a result, the fixing plate 14a is fixed to the fuel cell stack 12 through the spacer 18a, and the fixing plate 14b is fixed to the fuel cell stack 12 through the spacer 18b.

Referring again to FIGS. 2 to 4, the fuel cell stack 12 includes two fuel cells 20a and 20b which are formed into a plate shape and stacked in the z-axis direction. Note that since the fuel cells 20a and 20b have the same structure, the description of the structure of the fuel cell 20b is omitted by assigning the same reference signs to the same members.

The fuel cell 20a has a structure in which an air-electrode-side conductor layer 121, an air electrode layer 122, a solid electrolyte layer 123, a fuel electrode layer 124, and a fuel-electrode-side conductor layer 125 are stacked in this order on the positive side in the z-axis direction. The air-electrode-side conductor layer 121 is a layer in which the via conductors VHa, VHa, . . . are embedded using a separator SP1 as a base material. The air electrode layer 122 is a layer in which the air electrodes CT are embedded using a separator SP2 as a base material. The solid electrolyte layer 123 is a layer using an electrolyte EL as a base material. The fuel electrode layer 124 is a layer in which the fuel electrodes AN are embedded using a separator SP4 as a base material. The fuel-electrode-side conductor layer 125 is a layer in which the via conductors VHf, VHf, . . . are embedded using a separator SP5 as a base material.

A metallic plate 22 is disposed between the fuel cells 20a and 20b. The metallic plate 22 is also formed of four small metallic plates 221 to 224. The area of the main surface (the upper surface or the lower surface) of each of the small metallic plates 221 to 224 is slightly smaller than one-quarter of the area of the main surface of each of the fuel cells 20a and 20b.

The small metallic plate 221 is disposed at a position on the positive side in the X-axis direction and on the positive side in the Y-axis direction between the fuel cells 20a and 20b in such a way that the upper surface of the small metallic plate 221 faces some of the via conductors VHa, VHa, . . . and the lower surface of the small metallic plate 221 faces some of the via conductors VHf, VHf, . . . . The small metallic plate 222 is disposed at a position on the negative side in the X-axis direction and on the positive side in the Y-axis direction between the fuel cells 20a and 20b in such a way that the upper surface of the small metallic plate 222 faces some of the other via conductors VHa, VHa, . . . and the lower surface of the small metallic plate 222 faces some of the other via conductors VHf, VHf, . . . .

The small metallic plate 223 is disposed at a position on the negative side in the X-axis direction and on the negative side in the Y-axis direction between the fuel cells 20a and 20b in such a way that the upper surface of the small metallic plate 223 faces some of the other via conductors VHa, VHa, . . . and the lower surface of the small metallic plate 223 faces some of the other via conductors VHf, VHf, . . . . The small metallic plate 224 is disposed at a position on the positive side in the X-axis direction and on the negative side in the Y-axis direction between the fuel cells 20a and 20b in such a way that the upper surface of the small metallic plate 224 faces some of the other via conductors VHa, VHa, . . . and the lower surface of the small metallic plate 224 faces some of the other via conductors VHf, VHf, . . . .

The via conductors VHa, VHa, . . . which are provided on the fuel cell 20a are electrically connected to the via conductors VHf, VHf, . . . , which are provided on the fuel cell 20b, through the metallic plate 22 disposed as described above.

The spacer 24 is disposed between the fuel cells 20a and 20b at a position where the metallic plate 22 is not formed, so as to adjust the distance from the lower surface of the fuel cell 20a to the upper surface of the fuel cell 20b to the distance equal to the thickness of the metallic plate 22. At this time, the upper surface of the spacer 24 faces the lower surface of the fuel cell 20a, and the lower surface of the spacer 24 faces the upper surface of the fuel cell 20b.

Further, since the metallic plate 22 is disposed as described above, the main surface (the upper surface or the lower surface) of the spacer 24 has a cross shape. Further, the spacer 24 is provided with four through-holes that constitute the manifolds MFf1, MFf2, MFa1, and MFa2, respectively.

As is seen from FIG. 5, the conductive material 26 is disposed between the lower surface of the fuel cell 20a and the upper surface of the metallic plate 22. The conductive material 26 is also disposed between the upper surface of the fuel cell 20b and the lower surface of the metallic plate 22. A small gap formed between the metallic plate 22 and each of the fuel cells 20a and 20b is filled with the conductive material 26.

The adhesive 28 is disposed between the lower surface of the fuel cell 20a and the upper surface of the spacer 24, and the adhesive 28 is also disposed between the upper surface of the fuel cell 20b and the lower surface of the spacer 24. As a result, the fuel cells 20a and 20b are fixed with each other through the spacer 24.

An externally supplied air electrode gas passes through the manifolds MFa1 and MFa2 and reaches the air electrodes CT. An externally supplied fuel electrode gas passes through the manifolds MFf1 and MFf2 and reaches the fuel electrodes AN. The air electrode gas and the fuel electrode gas cause electrochemical reactions as represented by chemical formulas 1 and 2, with the result a positive voltage and a negative voltage appear on both surfaces of the electrolyte EL.

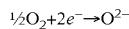

$$\tfrac{1}{2}O_2 + 2e^- \rightarrow O^{2-} \qquad \text{[Formula 1]}$$

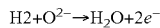

$$H_2 + O^{2-} \rightarrow H_2O + 2e^- \qquad \text{[Formula 2]}$$

Part of the air electrode gas and the fuel electrode gas is discharged to the outside of the fuel cell stack 12, without causing any chemical reactions. The air electrode gas is discharged through a plurality of grooves GRa, GRa, ... which are formed in the upper surface of the separator SP1 in such a way that the grooves face the air electrodes CT. The fuel electrode gas is discharged through a plurality of grooves GRf, GRf, ... which are formed in the lower surface of the separator SP5 in such a way that the grooves face the fuel electrodes AN. The discharged air electrode gas and fuel electrode gas react each other and generate heat, thereby accomplishing a thermal self-sustainability.

The fixing plates 14a and 14b and the spacers 18a and 18b are made of 3YSZ (Yttria-stabilized zirconia). The separators SP1 to SP5, which constitute the fuel cells 20a and 20b, are also made of 3YSZ. Therefore, the thermal expansion coefficients of the fixing plates 14a and 14b, the spacers 18a and 18b, and the separators SP1 to SP5 are the same. The collector plates 16a and 16b and the metallic plate 22 are made of ferritic stainless steel, and the conductive material 26 is made of LSM (Lanthanum strontium manganite) which is a conductive ceramic.

Note that the difference between the thermal expansion coefficients of the fixing plates 14a and 14b, the spacers 18a and 18b, and the separators SP1 to SP5 is preferably within 5%. The difference between the thermal expansion coefficients of the fixing plates 14a and 14b, the spacers 18a and 18b, the separators SP1 to SP5, and the collector plates 16a and 16b is 2 ppm/° C. or less.

Basically, the materials of the collector plates 16a and 16b, the metallic plate 22, and the conductive material 26 can be arbitrarily selected from among a metal, an alloy, and a conductive ceramic. However, a thermal stress is generated in the fuel cells 20a to 20b, the collector plates 16a and 16b, and the metallic plate 22 under an environment in which the fuel cell unit 10 operates.

Accordingly, in view of suppressing the thermal stress and avoiding a connection failure, a material having a thermal expansion coefficient close to the thermal expansion coefficients of the fixing plates 14a and 14b, the spacer 18a and 18b, and the separators SP1 to SP5 is preferably used as the conductive material 26.

Further, in view of suppressing the electric resistance, the conductive material 26 is preferably a material based on LaSrMnO3, LaCrO3, LaCoO3, MnCoO3, or the like as conductive ceramics, or is preferably Ag, Pd, Au, Pt, Rh, or Ru, or an alloy including at least two of these components as noble metals.

Furthermore, the conductive material 26 is disposed so as to fill a small gap formed between the fuel cell stack 12 and each of the collector plates 16a and 16b and a small gap formed between the metallic plate 22 and each of the fuel cells 20a and 20b. Accordingly, the conductive material 26 has a structure that relaxes the thermal stress (an easily deformable structure such as a mesh structure, a felt structure, a sponge structure, or a porous structure).

Further, the adhesive 28 is made of crystallized glass, and is softened at about 700° C. and is crystalized at a temperature of 900 to 1000° C. The softened and crystallized adhesive 28 is brought into close contact with the fixing plates 14a and 14b, the spacers 18a and 18b, and the fuel cells 20a to 20b. As a result, the fixing plate 14a is fixed to the fuel cell 20a through the spacer 18a and the fixing plate 14b is fixed to the fuel cell 20b through the spacer 18b, so that the fuel cells 20a and 20b are fixed with each other through the spacer 24.

As a result, due to the thermal expansion of the fuel cells 20a to 20b, the fixing plates 14a and 14b, the collector plates 16a and 16b, and the metallic plate 22, a force between the fuel cell 20a and the fixing plate 14a acts to sandwich the collector plate 16a; a force between the fuel cell 20b and the fixing plate 14b acts to sandwich the collector plate 16b; and a force between the fuel cells 20a and 20b acts to sandwich the metallic plate 22. These sandwiching forces further increase when a load is applied in the vertical direction of the fuel cell unit 10 during softening and crystallization of the adhesive 28. Thus, the reliability of an electrical connection between the fuel cell stack 20 and the collector plates 16a and 16b can be increased without the need for providing a load mechanism.

Figure 6A:
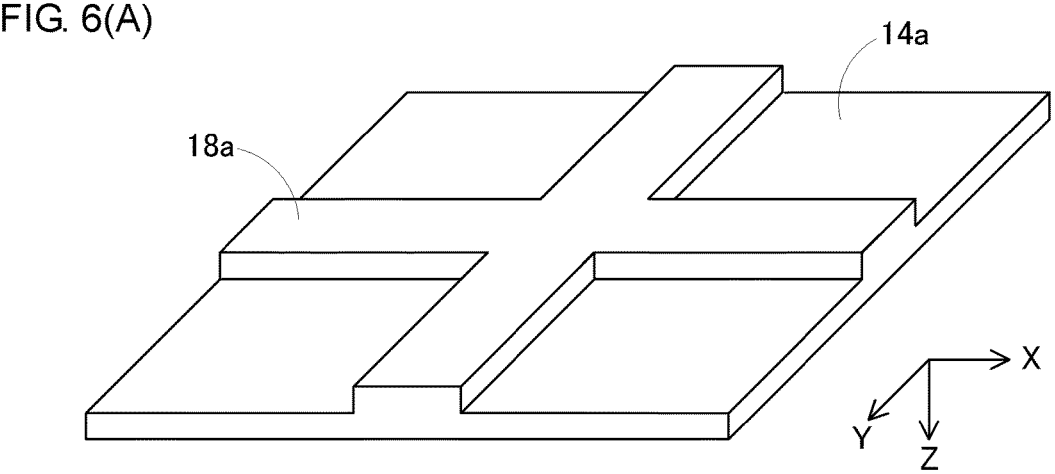
FIG. 6(A) is a perspective view showing a fixing plate and a spacer that are provided on a bottom layer of a fuel cell unit according to another embodiment.
Figure 6B:
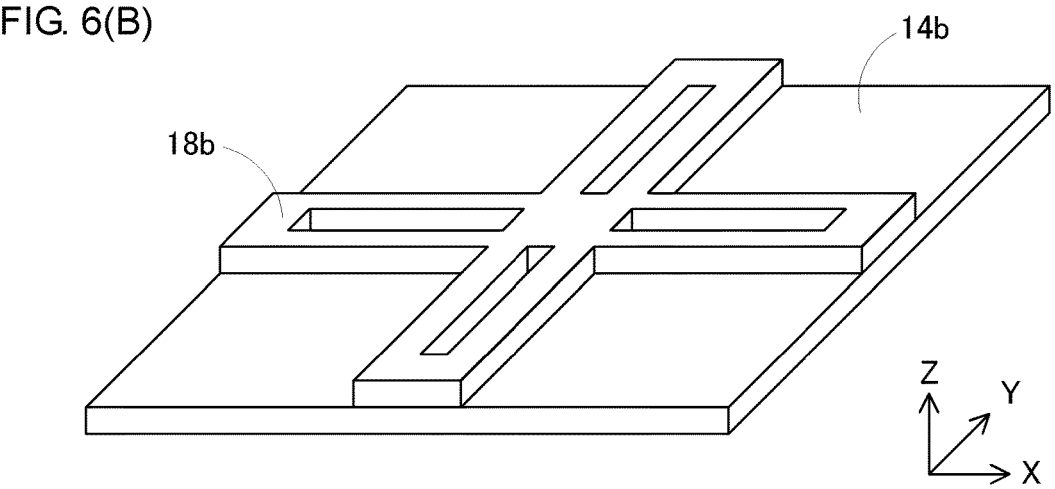
FIG. 6(B) is a perspective view showing a fixing plate and a spacer that are provided on a top layer of the fuel cell unit according to another embodiment.
Figure 7A:
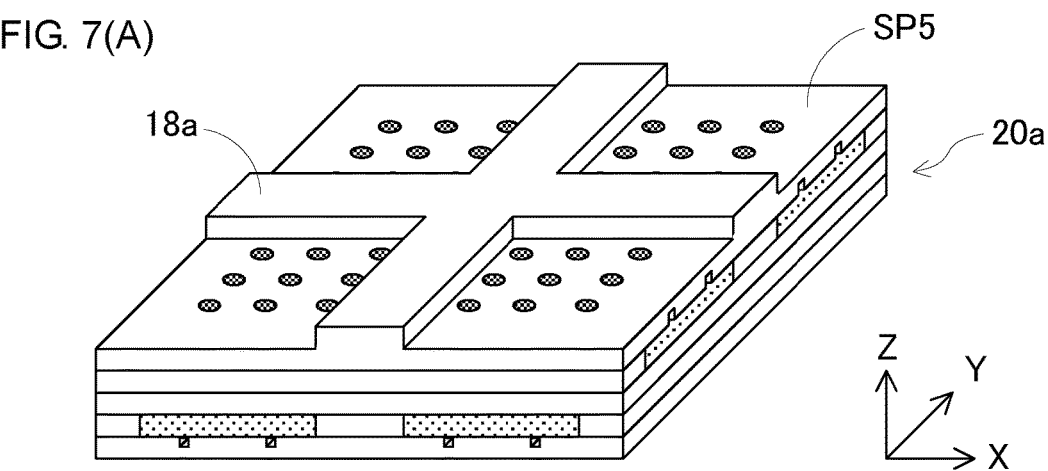
FIG. 7(A) is a perspective view showing a fuel cell and a spacer that are provided at an upper side of other fuel cell units.
Figure 7B:
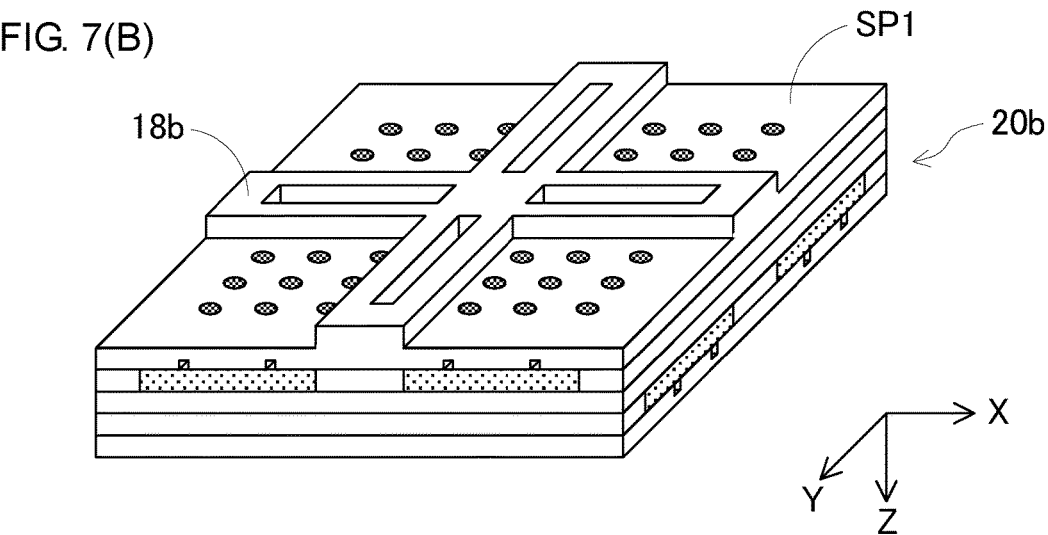
FIG. 7(B) is a perspective view showing a fuel cell and a spacer that are provided at a lower side of the other fuel cell units.

Note that in this embodiment, the spacer 18a is provided separately from the fixing plate 14a and the fuel cell 20a, and the spacer 18b is also provided separately from the fixing plate 14b and the fuel cell 20b. However, as shown in FIGS. 6(A) and 6(B), the spacers 18a and 18b may be integrally formed with the fixing plates 14a and 14b, respectively. As shown in FIGS. 7(A) and 7(B), the spacers 18a and 18b may be integrally formed with the separator SP5 constituting the fuel cell 20a and the separator SP1 constituting the fuel cell 20b, respectively.

Referring to FIG. 6(A), the spacer 18a is integrally formed with the fixing plate 14a, and the lower surface (i.e., the surface facing the negative side in the z-axis direction) of the spacer 18a faces the surface of the fuel cell stack 12, and the adhesive 28 is disposed between the surface of the fuel cell stack 12 and the lower surface of the spacer 18a. Referring to FIG. 6(B), the spacer 18b is integrally formed with the fixing plate 14b. The upper surface (i.e., the surface facing the positive side in the z-axis direction) of the spacer 18b faces the surface of the fuel cell stack 12, and the adhesive 28 is disposed between the surface of the fuel cell stack 12 and the upper surface of the spacer 18b.

Referring to FIG. 7(A), the spacer 18a is integrally formed with the separator SP5 constituting the fuel cell 20a. The upper surface (i.e., the surface facing the positive side in the z-axis direction) of the spacer 18a faces the lower surface of the fixing plate 14a; and the adhesive 28 is disposed between the lower surface of the fixing plate 14a and the upper surface of the spacer 18a. Referring to FIG. 7(B), the spacer 18b is integrally formed with the separator SP1 constituting the fuel cell 20b. The lower surface (i.e., the surface facing the negative side in the z-axis direction) of the spacer 18b faces the upper surface of the fixing plate 14b, and the adhesive 28 is disposed between the upper surface of the fixing plate 14b and the lower surface of the spacer 18b.

Further, in this embodiment, nothing is interposed between the fixing plate 14a and the collector plate 16a, and nothing is interposed between the fixing plate 14b and the collector plate 16b. However, a conductive material serving as a buffer may be disposed between the fixing plate 14a and the collector plate 16a and between the fixing plate 14b and the collector plate 16b.

REFERENCE SIGNS LIST

10 Fuel cell unit
12 Fuel cell stack
14a, 14b Fixing plate
16a, 16b Collector plate
22 Metallic plate
18a, 18b, 24 Spacer
20a, 20b Fuel cell
26 Conductive material
28 Adhesive
SP1-SP5 Separator
EL Electrolyte
AN Fuel electrode
CT Air electrode

The invention claimed is:

1. A fuel cell unit comprising:
   (a) a solid oxide fuel cell stack including:
      (a-1) a plurality of stacked fuel cells, each fuel cell of the plurality of stacked fuel cells including a solid electrolyte layer, a fuel electrode layer and an air electrode layer stacked with the solid electrolyte layer interposed therebetween;
      (a-2) a first separator on the fuel electrode layer; and
      (a-3) a second separator on the air electrode layer,
      (a-4) each fuel cell of the plurality of stacked fuel cells defining a fuel electrode gas flow channel in fluid communication with the fuel electrode layer and an air electrode gas flow channel in fluid communication with the air electrode layer;
      (a-5) a first via conductor extending through the first separator to a first end face of the plurality of stacked fuel cells in a stacking direction, the first via conductor being electrically connected to the fuel electrode layer; and
      (a-6) a second via conductor extending through the second separator to a second end face of the plurality of stacked fuel cells in the stacking direction, the second via conductor being electrically connected to the air electrode layer;
   (b) a first collector plate electrically connected to the first via conductor and wherein a surface of the first collector plate is exposed from at least one side surface of the solid oxide fuel cell stack;
   (c) a second collector plate electrically connected to the second via conductor and wherein a surface of the second collector plate is exposed from the at least one side surface of the solid oxide fuel cell stack;
   (d) a first fixing plate disposed such that the first collector plate is between the first fixing plate and the first end face of the plurality of stacked fuel cells;
   (e) a second fixing plate disposed such that the second collector plate is between the second fixing plate and the second end face of the plurality of stacked fuel cells;
   (f) a first spacer between the solid oxide fuel cell stack and the first fixing plate;
   (g) a second spacer between the solid oxide fuel cell stack and the second fixing plate; and
   (h) an adhesive material that secures at least one of the first fixing plate to the first spacer and the first spacer to the first end face of the solid oxide fuel cell stack, and that secures at least one of the second fixing plate to the second spacer and the second spacer to the second end face of the solid oxide fuel cell stack.

2. The fuel cell unit according to claim 1, wherein the adhesive material secures both of the first fixing plate to the first spacer and the first spacer to the first end face of the solid oxide fuel cell stack, and secures both of the second fixing plate to the second spacer and the second spacer to the second end face of the solid oxide fuel cell stack.

3. The fuel cell unit according to claim 1, wherein the first spacer is integrally formed with the first fixing plate, the second spacer is integrally formed with the second fixing plate, and the adhesive material is disposed between the first spacer and the first end face of the solid oxide fuel cell stack, and is disposed between the second spacer and the second end face of the solid oxide fuel cell stack.

4. The fuel cell unit according to claim 1, wherein the first spacer is integrally formed with the first end face of the solid oxide fuel cell stack, the second spacer is integrally formed with the second end face of the solid oxide fuel cell stack, and the adhesive material is disposed between first spacer and the first fixing plate, and is disposed between the second spacer and the second fixing plate.

5. The fuel cell unit according to claim 1, wherein each of the first fixing plate and the first spacer has a thermal expansion coefficient equal to a thermal expansion coefficient of the first separator.

6. The fuel cell unit according to claim 5, wherein each of the second fixing plate and the second spacer has a thermal expansion coefficient equal to a thermal expansion coefficient of the second separator.

7. The fuel cell unit according to claim 1, wherein each of the second fixing plate and the second spacer has a thermal expansion coefficient equal to a thermal expansion coefficient of the second separator.

8. The fuel cell unit according to claim 1, further comprising a conductive material disposed between the first end face of the solid oxide fuel cell stack and the first collector plate, and disposed between the second end face of the solid oxide fuel cell stack and the second collector plate.

9. The fuel cell unit according to claim 8, wherein the conductive material has a structure that is deformable in response to a thermal stress generated between the solid oxide fuel cell stack and the first and second collector plates.

10. The fuel cell unit according to claim 1, wherein a difference between a first thermal expansion coefficient of the first and second collector plates and a second thermal expansion coefficient of each of the first and second separators, the first and second fixing plates, and the first and second spacers is 2 ppm/° C. or less.

11. The fuel cell unit according to claim 1, wherein the first and second fixing plates, the first and second spacers, and the first and second spacers are made of yttria-stabilized zirconia, and the first and second collector plates are made of ferritic stainless steel.

12. The fuel cell unit according to claim 1, wherein the adhesive material is made of crystallized glass.

13. The fuel cell unit according to claim 1, wherein the first and second via conductors are each divided into four respective sections.

14. The fuel cell unit according to claim 13, wherein the first collector plate and the second collector plate are each divided into four respective sections,
  each of the four sections of the first collector plate being electrically connected to a respective one of the four sections of the first via conductor, and
  each of the four sections of the second collector plate being electrically connected to a respective one of the four sections of the second via conductor.

15. The fuel cell unit according to claim 14, wherein each of the first and second spacers have a cross shape,
  the first spacer extending between the four respective sections of the first collector plate, and
  the second spacer extending between the four respective sections of the second collector plate.

* * * * *